United States Patent
Boxwell et al.

(10) Patent No.: US 11,194,967 B2
(45) Date of Patent: Dec. 7, 2021

(54) UNSUPERVISED ON-THE-FLY NAMED ENTITY RESOLUTION IN DYNAMIC CORPORA

(71) Applicant: International Business Machines Corporation, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/921,818

(22) Filed: Mar. 15, 2018

(65) Prior Publication Data
US 2019/0286697 A1 Sep. 19, 2019

(51) Int. Cl.
*G06F 40/30* (2020.01)
*G06F 40/20* (2020.01)
(Continued)

(52) U.S. Cl.
CPC .......... *G06F 40/295* (2020.01); *G06F 16/288* (2019.01); *G06F 16/35* (2019.01); *G06F 40/253* (2020.01); *G06K 9/6256* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 8,374,844 B2 * 2/2013 Brun ..................... G06F 40/295
704/9
9,495,358 B2 11/2016 Zuev
(Continued)

OTHER PUBLICATIONS

Peter Mell, "The NIST Definition of Cloud Computing," Special Publication 800-145; pp. 1-7, Sep. 2011.
(Continued)

*Primary Examiner* — Lamont M Spooner
(74) *Attorney, Agent, or Firm* — Brian Welle; Otterstedt, Wallace & Kammer, LLP

(57) ABSTRACT

A method for providing unsupervised entity resolution to a natural language processing system includes receiving a named entity for training from the natural language processing system, searching a corpus for a first undisambiguated named entity corresponding to the named entity, identifying a plurality of disambiguated named entities corresponding to the first undisambiguated named entity, identifying a plurality of aliases for each of the disambiguated named entities, training a classifier for the each of the disambiguated named entities utilizing the aliases identified for respective ones of the disambiguated named entities using the corpus, and resolving the named entity using the classifier, wherein resolving the named entity comprises selecting one of the disambiguated named entities from among the disambiguated named entities and returning, automatically, the selected disambiguated named entity to the natural language processing system.

20 Claims, 5 Drawing Sheets

(51) Int. Cl.
*G06F 40/279* (2020.01)
*G06F 40/295* (2020.01)
*G06K 9/62* (2006.01)
*G06F 16/35* (2019.01)
*G06F 16/28* (2019.01)
*G06F 40/253* (2020.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795; G06F 40/211; G06F 40/253; G06F 40/268; G06F 40/284; G06F 40/30
USPC .................................. 704/1, 9, 10
See application file for complete search history.

(56) References Cited

U.S. PATENT DOCUMENTS

| | | | |
|---|---|---|---|
| 9,772,996 | B2 | 9/2017 | Sheafer |
| 9,953,652 | B1* | 4/2018 | Rao ............... G06F 16/24564 |
| 2005/0149538 | A1* | 7/2005 | Singh ............... G06F 16/972 |
| 2007/0010989 | A1* | 1/2007 | Faruquie ............ G06F 40/44 704/2 |
| 2009/0282012 | A1* | 11/2009 | Konig ............... G06F 40/295 |
| 2010/0223292 | A1* | 9/2010 | Bhagwan ........... G06F 40/295 707/780 |
| 2011/0131244 | A1* | 6/2011 | Padovitz ........... G06F 16/355 707/776 |
| 2011/0213742 | A1* | 9/2011 | Lemmond .......... G06F 16/3344 706/13 |
| 2011/0225155 | A1* | 9/2011 | Roulland ............. G06F 16/285 707/737 |
| 2011/0282892 | A1* | 11/2011 | Castellani ........... G06F 16/242 707/766 |
| 2012/0011428 | A1* | 1/2012 | Chisholm ............ G06F 16/313 715/230 |
| 2012/0096033 | A1* | 4/2012 | Shah .................. G06F 16/3338 707/780 |
| 2013/0311467 | A1* | 11/2013 | Galle ................. G06F 40/247 707/737 |
| 2015/0262078 | A1* | 9/2015 | Sarikaya ............. G06F 16/313 706/12 |
| 2015/0286747 | A1* | 10/2015 | Anastasakos ....... G06F 16/3344 707/776 |
| 2015/0331850 | A1* | 11/2015 | Ramish ............... G06F 16/245 704/9 |
| 2016/0012111 | A1* | 1/2016 | Pattabhiraman ..... G06F 16/284 707/722 |
| 2016/0048500 | A1* | 2/2016 | Hebert ................ G06F 40/295 704/9 |
| 2016/0055246 | A1* | 2/2016 | Marcin ............... G06F 16/9535 707/732 |
| 2016/0306846 | A1* | 10/2016 | Adams, Jr. ............... G06N 5/02 |
| 2017/0069315 | A1* | 3/2017 | Chung .................... G06F 40/20 |
| 2017/0199963 | A1* | 7/2017 | Kondadadi ............ G16H 10/60 |
| 2018/0082197 | A1* | 3/2018 | Aravamudan ......... G06N 5/022 |
| 2019/0236139 | A1* | 8/2019 | DeFelice ................ G06F 40/56 |
| 2019/0236492 | A1* | 8/2019 | Saha ..................... G06N 20/00 |

OTHER PUBLICATIONS

Bhattacharya, I. et al., "A Latent Dirichlet Model for Unsupervised Entity Resolution," SIAM International Conference on Data Mining, pp. 1-12, Apr. 2006.

Anonymously, "Two-step approach to supervised and unsupervised learning for grouping of search-results," http://ip.com/IPCOM/000195810D, pp. 1-8, May 18, 2010.

Anonymously, "System and Method of secure and permissioned sharing of Cognitive Patterns in a Marketplace," http://ip.com/IPCOM/000250922D, pp. 1-6, Sep. 14, 2017.

Sen, P. et al., "Method and System for Dynamically Identifying and Annotating Entities in a User Generated Content (UGC)," http://ip.com/IPCOM/000212319D, pp. 1-7, Nov. 7, 2011.

* cited by examiner

UNSUPERVISED ON-THE-FLY NAMED ENTITY RESOLUTION IN DYNAMIC CORPORA

The present disclosure relates generally to Natural Language Processing (NLP), and more particularly to methods for named entity resolution.

Named Entity Resolution (NER) is a well-known and studied problem in the field of NLP. NER methods attempt to locate and classify named entities in text into one or more pre-defined categories.

BRIEF SUMMARY

According to an embodiment of the present invention, a method for providing unsupervised entity resolution to a natural language processing system includes receiving a named entity for training from the natural language processing system, searching a corpus for a first undisambiguated named entity corresponding to the named entity, identifying a plurality of disambiguated named entities corresponding to the first undisambiguated named entity, identifying a plurality of aliases for each of the disambiguated named entities, training a classifier for the each of the disambiguated named entities utilizing the aliases identified for respective ones of the disambiguated named entities using the corpus, and resolving the named entity using the classifier, wherein resolving the named entity comprises selecting one of the disambiguated named entities from among the disambiguated named entities and returning, automatically, the selected disambiguated named entity to the natural language processing system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide a NLP method for NER with one or more of the following advantages:

NER requiring no labeled training data,
NER automatically adapting with new additions to the corpus,
NER requiring no expensive caching of large numbers of disambiguation models.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
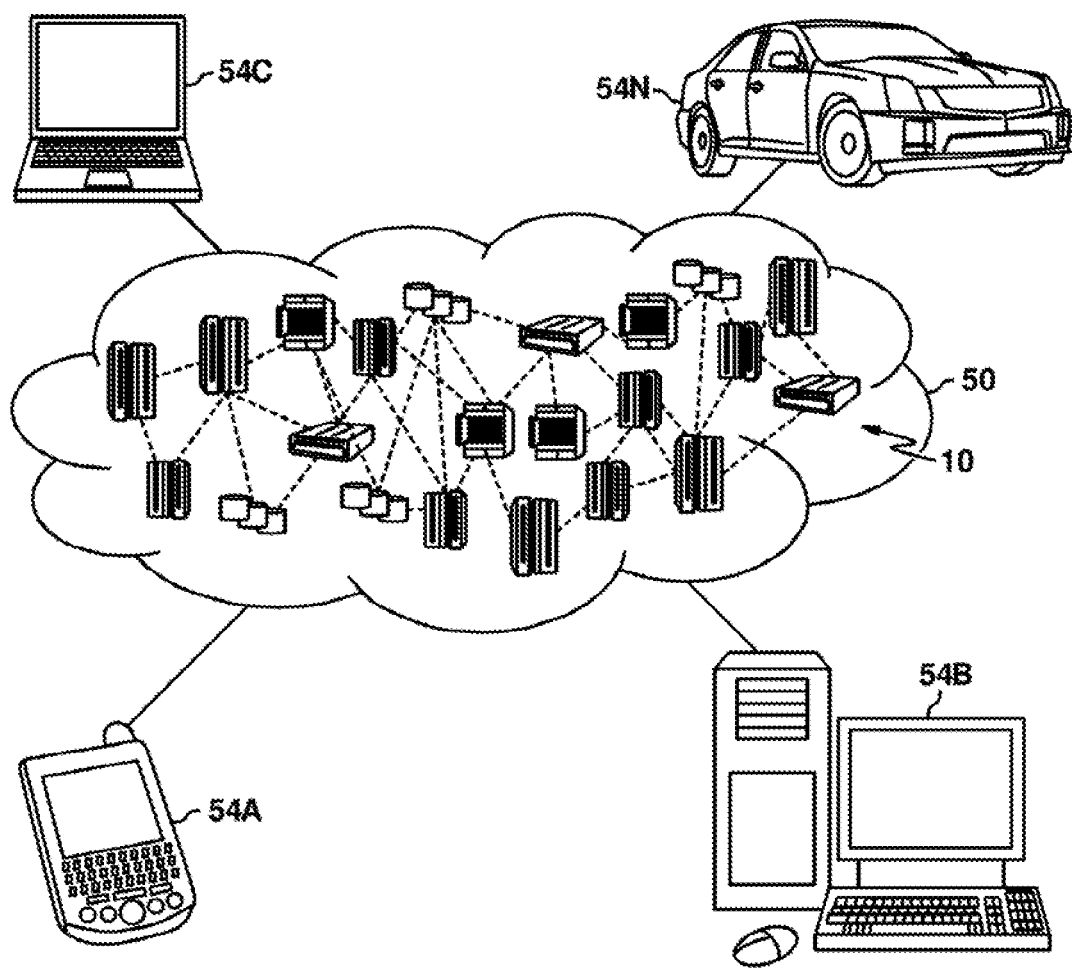
FIG. 1 depicts a cloud computing environment according to an embodiment of the present invention.

Embodiments of the present invention are related to computer based Natural Language Processing (NLP), and more particularly to methods for Named Entity Resolution (NER) in which an unsupervised agent (i.e., special purpose code executing on a computer processor) identifies one or more likely disambiguated named entities corresponding to a named entity in free text (i.e., a corpus), and where the unsupervised agent adapts with changes to the corpus.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
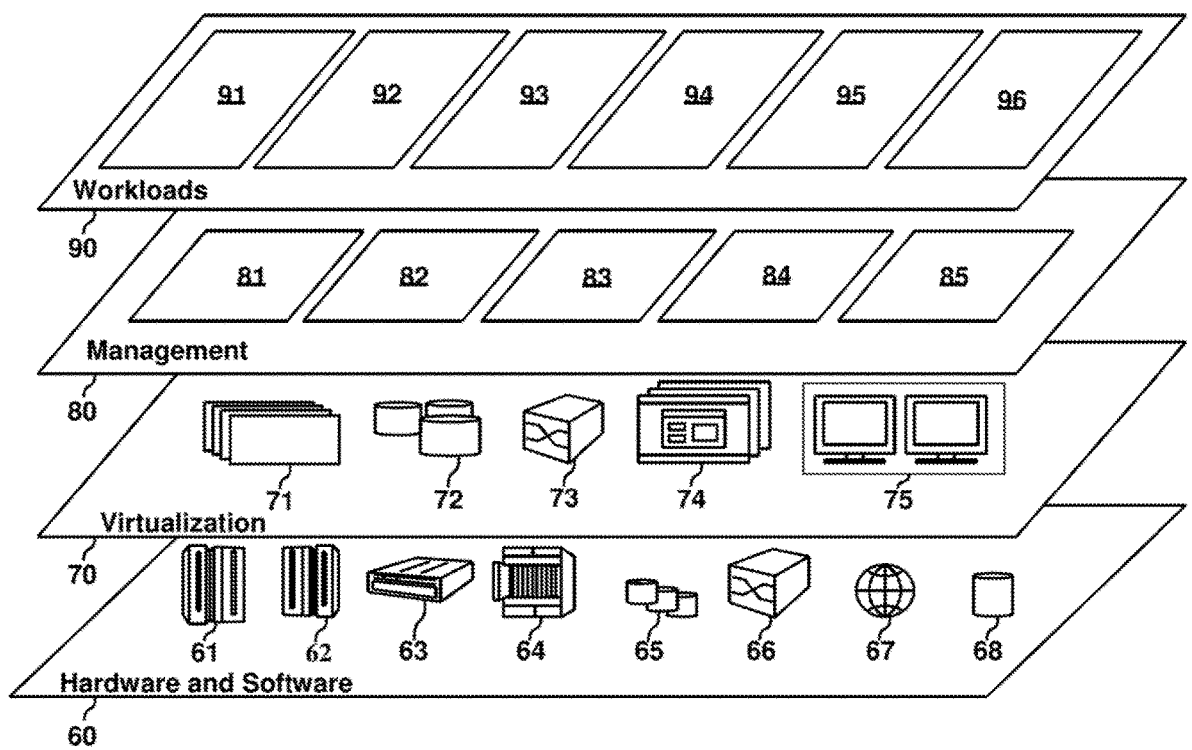
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Named Entity Resolution (NER) 96.

As used herein, natural language processing (NLP) refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input.

According to an embodiment of the present invention, an agent (i.e., special purpose code executing on a computer processor) augments an NLP system. The agent performs a method for disambiguating named entities 300 (see FIG. 3), improving the performance of, or augmenting the features of, the NLP system. The agent receives a named entity and its context 301 as input, and performs a corpus search to identify possible Undisambiguated Named Entities (UNEs) corresponding to the named entity 302, the set of UNEs forming first search results. The agent analyzes the first search results (i.e., the sets of possible UNEs) to identify one or more Disambiguated Named Entities (DNEs) 303, for example, by a lookup in a list or a database of UNE and corresponding DNE. Alternatively, the DNE are obtained upon identifying the UNE in a case where each UNE is provided with a set of possible DNE. The method further includes performing a corpus search to identify aliases (second search results) of the named entity 304. The agent trains a classifier for each DNE using the aliases as a search query on the corpus 305. The agent applies the trained classifier to the corpus to resolve the named entity 306 and returns a result of the resolution of the named entity to the NLP system 307. According to an exemplary embodiment of the present invention, the result includes one or more of the DNE determined to be associated with the named entity.

Figure 4:
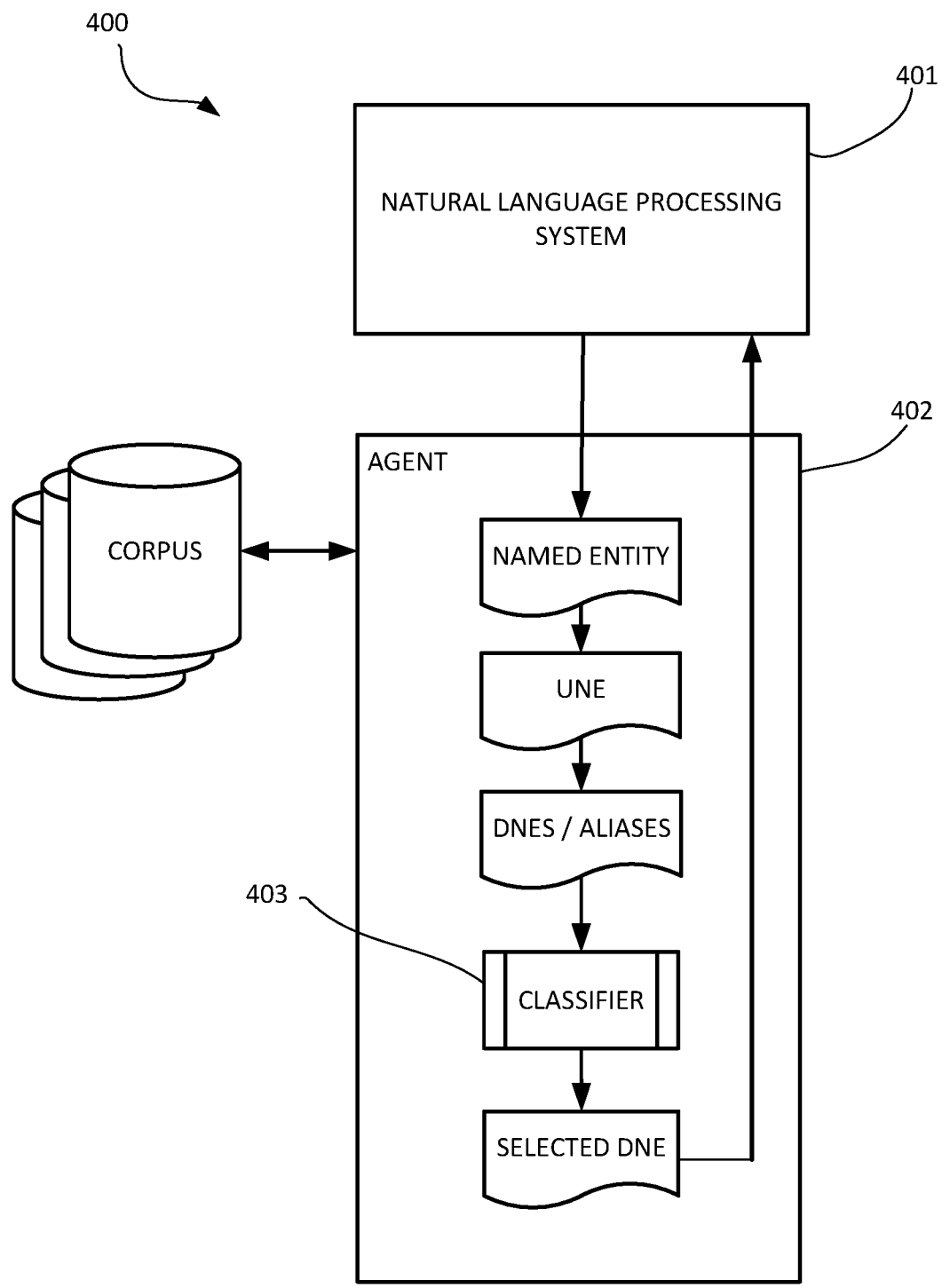
FIG. 4 is a block diagram depicting an exemplary agent system configured to perform a method of NER according to an exemplary embodiment of the present invention.

Referring to FIG. 4 and a schematic illustration of an NER system 400 including an NLP system 401 augmented by an agent 402 configured according to an embodiment of the present invention. The NLP system 401 can be configured for machine translation, information extraction, question answering, etc. In performing one or more of these tasks, the NLP system 401 is configured to analyze content and extract meta-data such as concepts, entities, keywords, categories, relations and semantic roles. The NLP system 401 passes extracted named entities to the agent 402 for additional processing (i.e., disambiguation of the named entities), including the on-the-fly training of a classifier 403 for each received named entity.

According to an exemplary embodiment of the present invention, the classifier 403 is learned on-the-fly as named entities are received, using a most up-to-date corpus available to the agent 402. According to at least one embodiment of the present invention, the agent relies on available corpora and does not store local copies of any corpus. According to at least one embodiment of the present invention, the agent does not store a persistent copy of the classifier 403, such that each classifier is learned using the most up-to-date corpus available to the agent 402.

According to at least one embodiment of the present invention, the agent 402 is configured as a sub-system or module of the NLP system 401, executing on the same computer system as the NLP system 401, or as a service executing remote from the NLP system 401, e.g., on a different computer system, located across the Internet, etc.

Referring again to FIG. 3, according to an embodiment of the present invention, the named entity 301 is received from the NLP system 301 and can be string (i.e., text) or waveform type data. According to at least one embodiment of the present invention, the agent is configured to receive different types of input and distinguishes between text and waveform input at 308. In the case of a waveform input, the agent determines that the input is not text at 308 and performs a speech-to-text process 309 before identifying the UNE at 302.

It should be understood that text based input can be input to the NER system 400 using an input device, such as a keyboard or microphone. For example, speech or waveform type data can be input to the NER system 400 from a device running a smart assistant or the like.

For purposes of describing the invention, it should be assumed that the identified named entities are UNEs. The term "undisambiguated," when used in conjunction with the term entity, suggests that there are one or more possible aliases of the named entity. It should be understood that not all named entities are UNEs, and in such cases the agent 402 may, upon determining that no UNE exists for a named entity at 302 in FIG. 3, return a confirmation to the NLP 401 (e.g., "none").

Figure 3:
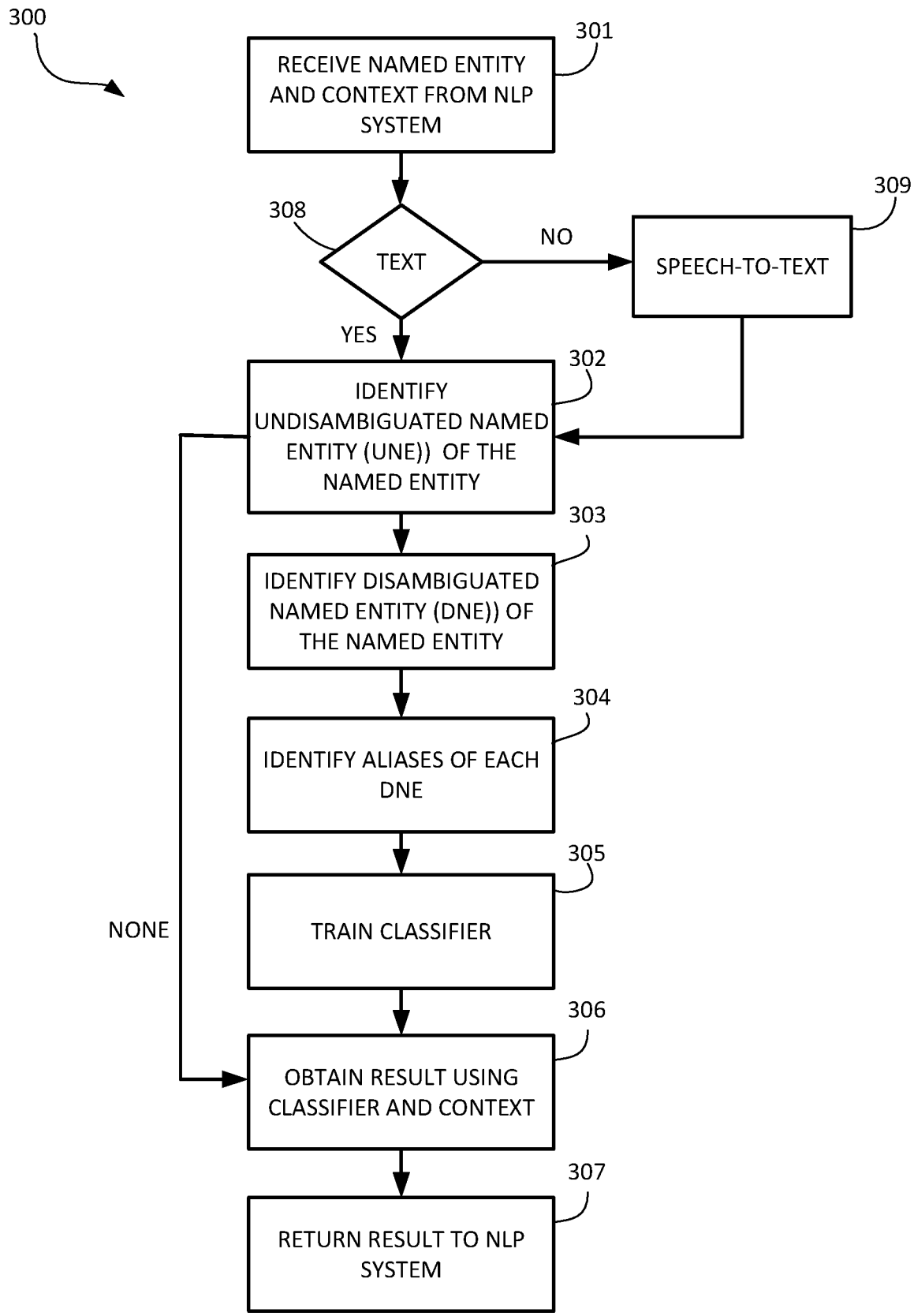
FIG. 3 depicts a method for NER according to an embodiment of the present invention.

Referring to block 302 of FIG. 3, the method includes performing a corpus search for UNEs corresponding to the named entity. According to an embodiment of the present invention, the corpus search 302 includes a search of one or more documents for strings (e.g., keywords) related to the named entity. According to another embodiment of the present invention, to identify the UNEs 302, the agent uses of one or more existing sources of named entities and their possible disambiguations (i.e., possible DNEs).

According to another embodiment of the present invention, the corpus is a collection of documents, for example, a collection of news articles. In one embodiment the method uses an online encyclopedia as the corpus. It should further be understood that the present invention contemplates the use of one or more different corpus. In at least one exemplary embodiment, the search for UNE can use a first corpus, such as the Wikipedia, while the search of aliases of the DNE can uses a second corpus including a collection of published documents including news services, scientific journals, etc. In view of the foregoing, it should be understood that the corpus is body of works that can include documents, internet search results, etc. For purposes of explaining embodiments of the present invention, it should be assumed that the corpus is related to the topic of the input data.

According to at least one embodiment, the search steps, e.g., 302, 303 and 304, do not change the corpus (i.e., the corpus does not change as it is queried). In at least one embodiment, the corpus is regularly updated, e.g., with current news articles. For example, if a new article is added to the corpus, the information from that article immediately becomes accessible to a next corpus search.

In at least one exemplary embodiment, the agent includes a set of rules for processing search results. For example, in at least one exemplary implementation, the agent assumes that any named entity that includes a proper last name (e.g., "Smith") potentially maps to any individual who shares that last name, which is generated from a list of names.

Referring to blocks 303 and 304 of FIG. 3, the method includes identifying DNEs and possible aliases (i.e., terms that could represent the named entity) of each identified DNE. According to an embodiment of the present invention, aliases are determined 304 by matching a searched-for string (i.e., the DNE) to the surface forms (i.e., linear sequences of characters) of terms in the corpus. The matching can be performed by using an existing full-text search engine, or other search engine.

Referring to block 305 of FIG. 3, the method further comprises training the classifier (e.g., a simple Naive Bayes classifier) on-the-fly (e.g., as sets of aliases are identified), with each class of the classifier representing each DNE.

Referring to block 306 of FIG. 3, the classifier is provided with the original context that each UNE appeared in and narrows the identified set of DNEs under consideration, obtaining a plurality of results (i.e., the narrowed list of DNEs).

According to another embodiment of the present invention, the results are the predictions (e.g., select ones of the DNE and associated confidences) of the trained classifier (e.g., a machine learned model), trained on-the-fly from the second results (i.e., DNE and aliases).

According to an embodiment of the present invention, the method described in FIG. 3 requires no labeled training data, automatically adapts with new additions to the corpus, and requires no caching of disambiguation models.

Consider the following example; the NLP system analyzes the text:

"Montana threw the football for 50 yards to get a first down."

The NLP system identifies a named entity "Montana" and passes this to the agent. The agent performs a search of a corpus and identifies "Montana" as a UNE. The agent identifies a list of unfiltered candidate DNEs that corresponding to the UNE "Montana" including:

DNE 1: "Joe Montana" (Retired NFL quarterback);
DNE 2: "Hannah Montana" (Title character of a Disney television show);
DNE 3: "The State of Montana" (A state of the U.S. that borders Canada);
DNE 4: "U.S.S. Montana" (U.S. naval vessel); etc.

For each DNE, the method includes a corpus search for each of these set of aliases. For example, a search for the first set of aliases (i.e., about Joe Montana) will likely return documents about the football player. A search for the second set of aliases (e.g., about Hannah Montana) will likely return documents about the fictional musician, and so on.

According to an embodiment of the present invention, the searches are performed done in parallel for improved performance.

Using the example above, a set of aliases are identified for each of these DNEs:

Aliases of DNE 1 Joe Montana: "Montana," "Joe Montana," "Joe Montani," "The Comeback Kid," "Bird Legs," "Joe Cool," "Golden Joe";
Aliases of DNE 2 Hannah Montana: "Montana," "Hannah Montana," "Hannah," "Smiley Miley," "Miley Cyrus";
Aliases of DNE 3 The State of Montana: "Montana," "The Treasure State," "Big Sky Country";
Aliases of DNE 4 USS Montana: "Montana," "US S Montana," "USS Montana BB-67"; etc.

Given the resulting set of DNEs and the associated aliases, the classifier is trained to distinguish between the individual DNE. According to an exemplary embodiment of the present invention, the classifier is a stemmed unigram Naive Bayes classifier. One of ordinary skill in the art would recognize that other classifiers can be implemented.

Referring more particularly to block 305 and the training of the classifier, an exemplary case requiring a disambiguation between DNE Joe Montana and DNE Hannah Montana will now be described. The agent performs a first search query on "Joe Montana," using the search query of all the surface forms of "Joe Montana" and a second search query for all the surface forms of "Hannah Montana."

For example, the first search query includes: "the joe football jr. kid comeback montana montana joseph player." The first search query returns the search results:

Portal: San Francisco Bay Area/Selected biography/Archive [[File:Joe Montana ESPN cropped2.jpg|right|50px]] [[Joe Montana|Joseph Clifford "Joe" Montana, Jr.]] (born Jun. 11, 1956), nicknamed Joe Cool and The Comeback Kid, is a retired professional American football player, a hall of fame quarterback with the San Francisco 49ers and Kansas City Chiefs. After winning a college national championship at Notre Dame, Montana started his NFL career in 1979 with San Francisco, where he played for the next 14 seasons. Traded before the 1993 season, he spent his final two years in the league with the Kansas City Chiefs. While a member of the 49ers, Montana started and won four Super Bowls and three Super Bowl Most Valuable Player awards. Montana was elected to the Pro Football Hall of Fame. in 2000, his first year of eligibility. Montana is the only player to have been named Super Bowl MVP three times.

. . .

The second search query includes: "hanna montanah miley cyrus montana hannah montanna hanna." The second search query returns the search results:

Que sera*[[Que sera (Miley Cyrus)|"Que sera" (Miley Cyrus)]], song on the Hannah Montana Forever album Hannah Montana (disambiguation)*[[Hannah Montana & Miley Cyrus: Best of Both Worlds Concert (album) |Hannah Montana & Miley Cyrus: Best of Both Worlds Concert (album)]], soundtrack to The Best of Both Worlds Concert film and a live album from Miley Cyrus The Best of Both Worlds (song) "The Best of Both Worlds" is a pop rock song performed by American singer—songwriter and actress Miley Cyrus, performing as Hannah Montana—the alter ego of Miley Stewart—a character she played on the Disney Channel television series Hannah Montana. It was released as the lead single from the Hannah Montana soundtrack album on Mar. 18, 2006. "The Best of Both Worlds" is the theme song for the television series; in the series third season, the 2009 Movie Mix is used as the theme

. . . .

The Other Side of Me*[[The Other Side of Me (Miley Cyrus song)|"The Other Side of Me" (Miley Cyrus song)]], a song from the album Hannah Montana by Miley Cyrus Best of Both Worlds Concert (soundtrack) Best of Both Worlds Concert is the accompanying live album for the concert film [[Hannah Montana & Miley Cyrus: Best of Both Worlds Concert]], released on Mar. 11, 2008 by Walt Disney Records. It includes live performances of songs from the soundtrack albums Hannah Montana (2006) and Hannah Montana 2: Meet Miley Cyrus (2007), which respectively accompany the first and second seasons of the television series Hannah Montana . . . .

Kara DioGuardi discography |[[Hannah Montana & Miley Cyrus: Best of Both Worlds Concert (album) |Hannah Montana & Miley Cyrus: Best of Both Worlds Concert]]
...

Having the search results from the first and second searches, the agent trains the classifier, for example, in a naïve Bayes model, which yields two classes: "Hannah Montana" and "Joe Montana." According to at least one embodiment of the present invention, each class is trained using unigrams (i.e., each term) appearing in the search results corresponding to each respective query. More generally, the naive Bayes model uses Bayes' theorem in the classifier's decision rule (e.g., maximum a posteriori). The model constructs the classifier by assigning class labels to problem instances, represented as vectors of feature values, where the class labels are drawn from some finite set.

It should be understood that the training can be configured to use features other than unigrams, assuming that the speed of the training step is acceptable for on-the-fly generation of the classifier.

Using the trained classifier, the method includes classifying a larger context (e.g., a phrase, sentence, paragraph, chapter, document, etc.) in which the named entity appeared. Using the example above, the ambiguous context, "Montana threw the football over 50 yards for a touchdown" is processed using the classifier to determine which class of "Montana" (e.g., "Joe Montana" or "Hannah Montana") best fits it. In at least one exemplary embodiment, the agent determines a probability P associated with each class or DNE, for example, "Hannah Montana—P 0.05" and "Joe Montana—P 0.95" and returns the class or DNE associated with the highest determined probability. More particularly, in at least one exemplary embodiment, the probability of "Joe Montana" can be determined using a naive Bayes classification, which is expressed as: ((the probability of the context observed given that the UNE refers to Joe Montana) times (the probability of Joe Montana given no context)) divided by (the probability of the context).

According to an embodiment of the present invention, the method can return a number of trained DNE and an associated probability for each. For example, the method can return the top three results (selected DNE) to the NLP system or return any result (selected DNE) with a probability greater than a given threshold (e.g., 35% probability). One of ordinary skill in the art would recognize that the agent can be configured to returns results according to an implementation.

According to at least one embodiment of the present invention, the agent outputs (e.g., displays) the result and the associated probability to an end user, for example, before returning the result to the NLP pipeline.

In view of the foregoing, according to an exemplary embodiment a method for adjustable unsupervised entity resolution includes receiving a named entity for training from an NLP system 301, searching a corpus for possible separate UNEs E (E1, E2, . . . , En) to form search results S (S1, S2, . . . , Sn) 302, identifying DNE Ni (N1, N2, . . . , Nj) 303 and aliases Ai (Ai1, Ai2, . . . , Aik) 304 for each of the search results Si, wherein the aliases Ai are aliases of the DNE Ni, training a classifier for the each Ni utilizing the aliases Ai dynamically against the corpus to form a dynamically trained classifier 305, and utilizing the dynamically trained classifier for resolving at least one named entity identified by the NLP system 306.

According to an embodiment of the present invention, the training of the classifier is unsupervised. According to at least one embodiment of the present invention, a first search for a first undisambiguated named entity, $E_i$, is executed in parallel with a second search for a second undisambiguated named entity, $E_j$.

Recapitulation:

According to an embodiment of the present invention, a method for providing unsupervised entity resolution to a natural language processing system includes receiving a named entity for training from the natural language processing system 301, searching a corpus for a first undisambiguated named entity corresponding to the named entity 302, identifying a plurality of disambiguated named entities corresponding to the first undisambiguated named entity 303, identifying a plurality of aliases for each of the disambiguated named entities 304, training a classifier for the each of the disambiguated named entities utilizing the aliases identified for respective ones of the disambiguated named entities using the corpus 305, and resolving the named entity using the classifier 307, wherein resolving the named entity comprises selecting one of the disambiguated named entities from among the disambiguated named entities and returning, automatically, the selected disambiguated named entity to the natural language processing system.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for NER. Further, a computer program product can include a tangible computer-readable recordable storage medium with code adapted to be executed to carry out one or more method steps described herein, including the provision of the system with the distinct software modules.

Figure 5:
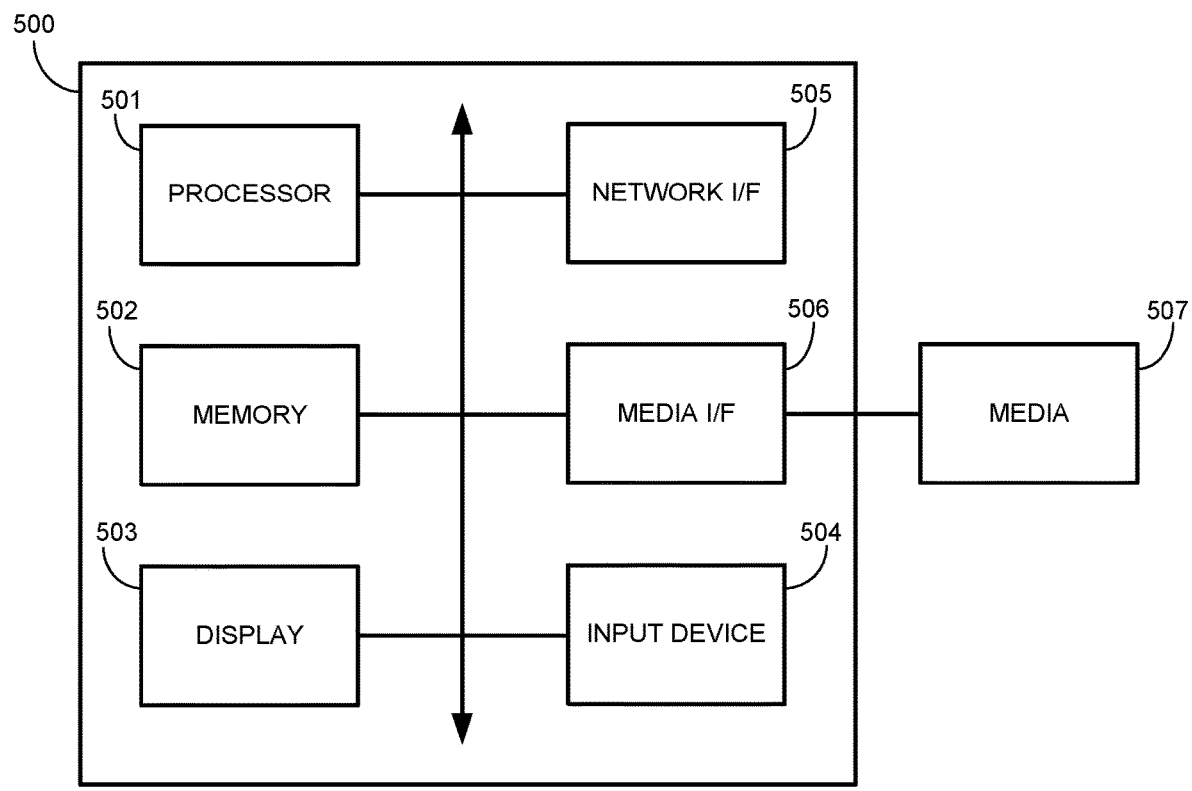
FIG. 5 is a block diagram depicting an exemplary computer system embodying a method for NER according to an exemplary embodiment of the present invention.

Referring to FIG. 5; FIG. 5 is a block diagram depicting an exemplary computer system 500 embodying the computer system for performing NER. The computer system 500 shown in FIG. 5 includes a processor 501, memory 502, display 503, input device 504 (e.g., keyboard), a network interface (I/F) 505, a media I/F 506, and media 507, such as a signal source, e.g., camera, Hard Drive (HD), external memory device, etc.

In different applications, some of the components shown in FIG. 5 can be omitted. The whole system shown in FIG. 5 is controlled by computer readable instructions, which are generally stored in the media 507. The software can be downloaded from a network (not shown in the figures), stored in the media 507. Alternatively, software downloaded from a network can be loaded into the memory 502 and executed by the processor 501 to complete the function determined by the software.

The processor 501 may be configured to perform one or more methodologies described in the present disclosure, illustrative embodiments of which are shown in the above figures and described herein. Embodiments of the present invention can be implemented as a routine that is stored in memory 502 and executed by the processor 501 to process the signal from the media 507. As such, the computer system is a general-purpose computer system that becomes a specific purpose computer system when executing routines of the present disclosure.

Although the computer system described in FIG. 5 can support methods according to the present disclosure, this system is only one example of a computer system (e.g., agent system). Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a general purpose computer, a method for providing unsupervised entity resolution to a natural language processing system comprising:
   receiving a named entity from the natural language processing system;
   identifying a first undisambiguated named entity corresponding to the named entity based on a search of a corpus;
   identifying a plurality of disambiguated named entities corresponding to the first undisambiguated named entity;
   identifying a plurality of aliases for each of the disambiguated named entities;
   training a plurality of classes of a classifier, wherein each of the disambiguated named entities corresponds to one of the classes, and the training of each of the classes utilizes the aliases identified for respective ones of the disambiguated named entities using the corpus; and
   resolving the named entity using the classifier, wherein resolving the named entity comprises selecting one of the disambiguated named entities from among the disambiguated named entities and returning, automatically, the selected disambiguated named entity to the natural language processing system.

2. The method of claim 1, wherein the training of the classifier is unsupervised and performed on-the-fly upon receiving the named entity.

3. The method of claim 1, further comprising identifying a second undisambiguated named entity corresponding to the named entity in parallel with the identification of the first undisambiguated named entity based on the search of the corpus.

4. The method of claim 1, wherein resolving the named entity further comprises determining a probability for each of the disambiguated named entities, wherein the probability is a probability that a respective disambiguated named entity is related to the undisambiguated named entity.

5. The method of claim 4, the selected disambiguated named entity has a highest probability among the disambiguated named entities.

6. The method of claim 1, wherein identifying the plurality of disambiguated named entities comprises a lookup to a database of undisambiguated named entities and associated disambiguated named entities.

7. The method of claim 1, wherein identifying the plurality of aliases for each of the disambiguated named entities comprises a lookup to a database of disambiguated named entities and associated aliases.

8. The method of claim 1, wherein identifying the plurality of aliases for each of the disambiguated named entities comprises a second search of the corpus comprising matching a string corresponding to a given one of the disambiguated named entities to surface forms of terms in the corpus to identify individual ones of the plurality of aliases.

9. The method of claim 1, wherein training the classifier is performed on-the-fly for the undisambiguated named entity with no caching of the classes corresponding to each of the disambiguated named entities for a subsequent named entity received from the natural language processing system.

10. The method of claim 1, wherein training the classifier comprises:
    obtaining search results for each of the disambiguated named entities using respective ones of the aliases as a search query of the corpus; and
    training each of the classes corresponding to each of the disambiguated named entities using unigrams appearing in the search results obtained using the aliases.

11. A non-transitory computer readable medium comprising computer executable instructions which when executed by a computer cause the computer to perform a method for providing unsupervised entity resolution to a natural language processing system, the method comprising:
    receiving a named entity from the natural language processing system;
    identifying a first undisambiguated named entity corresponding to the named entity based on a search of a corpus;
    identifying a plurality of disambiguated named entities corresponding to the first undisambiguated named entity;
    identifying a plurality of aliases for each of the disambiguated named entities;
    training a plurality of classes of a classifier, wherein each of the disambiguated named entities corresponds to one of the classes, and the training of each of the classes utilizes the aliases identified for respective ones of the disambiguated named entities using the corpus; and
    resolving the named entity using the classifier, wherein resolving the named entity comprises selecting one of the disambiguated named entities from among the disambiguated named entities and returning, automatically, the selected disambiguated named entity to the natural language processing system.

12. The computer readable medium of claim 11, wherein the training of the classifier is unsupervised and performed on-the-fly upon receiving the named entity.

13. The computer readable medium of claim 11, further comprising identifying a second undisambiguated named entity corresponding to the named entity in parallel with the identification of the first undisambiguated named entity based on the search of the corpus.

14. The computer readable medium of claim 11, wherein resolving the named entity further comprises determining a probability for each of the disambiguated named entities, wherein the probability is a probability that a respective disambiguated named entity is related to the undisambiguated named entity.

15. The computer readable medium of claim 14, the selected disambiguated named entity has a highest probability among the disambiguated named entities.

16. The computer readable medium of claim 11, wherein identifying the plurality of disambiguated named entities comprises a lookup to a database of undisambiguated named entities and associated disambiguated named entities.

17. The computer readable medium of claim 11, wherein identifying the plurality of aliases for each of the disambiguated named entities comprises a lookup to a database of disambiguated named entities and associated aliases.

18. The computer readable medium of claim 11, wherein identifying the plurality of aliases for each of the disambiguated named entities comprises a second search of the corpus comprising matching a string corresponding to a given one of the disambiguated named entities to surface forms of terms in the corpus to identify individual ones of the plurality of aliases.

19. The computer readable medium of claim 11, wherein training the classifier is performed on-the-fly for the undisambiguated named entity with no caching of the classes corresponding to each of the disambiguated named entities for a subsequent named entity received from the natural language processing system.

20. The computer readable medium of claim 11, wherein training the classifier comprises:
   obtaining search results for each of the disambiguated named entities using respective ones of the aliases as a search query of the corpus; and
   training each of the classes corresponding to each of the disambiguated named entities using unigrams appearing in the search results obtained using the aliases.

* * * * *